(No Model.)

H. G. FARR.
RING FOR HALTERS, TIE STRAPS, PESSARIES, &c.

No. 277,473. Patented May 15, 1883.

WITNESSES
Wm H. Boyd
G. W. Whittington

INVENTOR
Hiram G. Farr,
per Norman W. Stearns,
Attorney

UNITED STATES PATENT OFFICE.

HIRAM G. FARR, OF BOSTON, MASSACHUSETTS.

RING FOR HALTERS, TIE-STRAPS, PESSARIES, &c.

SPECIFICATION forming part of Letters Patent No. 277,473, dated May 15, 1883.

Application filed October 30, 1882. (No model.)

*To all whom it may concern:*

Be it known that I, HIRAM G. FARR, of Boston, in the county of Suffolk and State of Massachusetts, have invented certain Improvements in Rings for Tie-Straps, Halters, Pessaries, &c., of which the following is a full, clear, and exact description, reference being had to the accompanying drawings, making part of this specification, in which—

Figure 1:
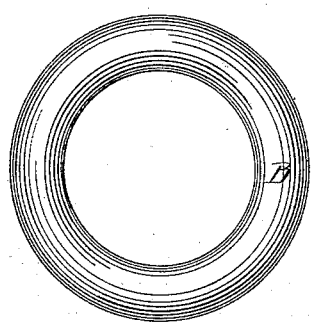
Figure 2:
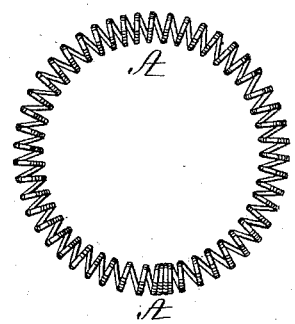
Figure 3:
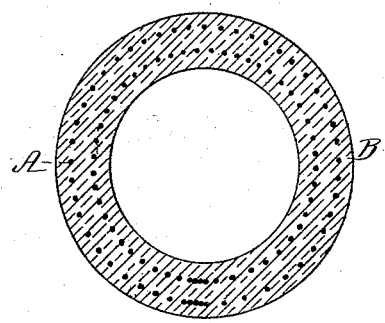
Figure 4:

Figure 1 is a plan of a ring having its interior constructed in accordance with my invention. Fig. 2 is a plan of a spiral spring having its ends united so as to form a ring, which constitutes the interior of the ring shown in Fig. 1. Fig. 3 is a horizontal section through my ring-connection. Fig. 4 is a transverse section through the same.

My present invention relates to certain improvements in rings for halters, tie-straps, pessaries, &c.; and it consists in an elastic ring composed of a centrally-located metallic spring spirally wound, having its ends united, so as to form an annular band, with a solid mass of vulcanized rubber molded around and through the same, whereby the union formed between them is nearly as strong and tenacious as though the parts were held by a homogeneous bond and the resiliency of the parts permanently maintained.

In the said drawings, A represents a spiral metallic spring having its ends united to form a circular band or ring, which is located within the center of a mold, and a quantity of rubber, B, allowed to cover its outside and enter and fill the longitudinal space at its center, and also the spaces between its contiguous coils, the spiral spring being thereby embedded and seated within a solid mass of rubber, B, which protects the spiral spring and gives support thereto, while the spiral spring preserves the strength and elasticity of the rubber, each affording mutual assistance to the other, which increases the durability and efficiency of the connection.

I claim—

An elastic ring composed of a centrally-located spirally-wound metallic spring, A, embedded within a solid mass of rubber, B, molded around and within it, substantially as described.

Witness my hand this 20th day of October, 1882.

HIRAM G. FARR.

In presence of—
N. W. STEARNS,
JAS. W. CHAPMAN.